United States Patent
Sato et al.

(10) Patent No.: US 10,431,800 B2
(45) Date of Patent: Oct. 1, 2019

(54) METHOD FOR MANUFACTURING BUSBAR MODULES

(71) Applicant: Yazaki Corporation, Tokyo (JP)

(72) Inventors: Katsunori Sato, Shizuoka (JP); Yutaro Okazaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 189 days.

(21) Appl. No.: 15/381,425

(22) Filed: Dec. 16, 2016

(65) Prior Publication Data

US 2017/0179459 A1    Jun. 22, 2017

(30) Foreign Application Priority Data

Dec. 18, 2015 (JP) .................... 2015-248012

(51) Int. Cl.
*H01M 2/20* (2006.01)
*H01M 2/22* (2006.01)
*H01R 43/16* (2006.01)
*H01M 2/10* (2006.01)

(52) U.S. Cl.
CPC ......... *H01M 2/206* (2013.01); *H01M 2/1077* (2013.01); *H01M 2/22* (2013.01); *H01R 43/16* (2013.01); *H01M 2220/20* (2013.01)

(58) Field of Classification Search
CPC ........... H01M 2220/20; H01M 2/1077; H01M 2/206; H01M 2/22; H01R 43/16
See application file for complete search history.

(56) References Cited

U.S. PATENT DOCUMENTS

| 5,486,651 A | * | 1/1996 | Morgan | H02G 5/007 |
| | | | | 174/129 B |
| 8,574,003 B2 | | 11/2013 | Ikeda et al. | |
| 9,716,262 B2 | * | 7/2017 | Ichikawa | H01M 2/206 |
| 10,003,065 B2 | * | 6/2018 | Ichikawa | H01M 2/206 |
| 10,014,510 B2 | * | 7/2018 | Ichikawa | H01M 2/206 |

(Continued)

FOREIGN PATENT DOCUMENTS

| CN | 102687308 A | 9/2012 |
| CN | 102751465 A | 10/2012 |

(Continued)

OTHER PUBLICATIONS

Chinese Office Action for the related Chinese Patent Application No. 201611166939.0 dated Nov. 28, 2018.

*Primary Examiner* — Minh N Trinh
(74) *Attorney, Agent, or Firm* — Kenealy Vaidya LLP

(57) ABSTRACT

A method for manufacturing busbar modules that includes placing a plurality of first linear conductors on one side and a plurality of second linear conductors on the other side across a long planar conductor, extruding an insulating cover material to cover the first linear conductors and join the first linear conductors to the planar conductor with the insulating cover material and to cover the second linear conductors and join the second linear conductors to the planar conductor with the insulating cover material, cutting the planar conductor along first, second and third cutting lines, forming a first busbar module by joining the first linear conductors and the plurality of busbars, and forming a second busbar module by joining the second linear conductors and the plurality of busbars.

4 Claims, 12 Drawing Sheets

(56) References Cited

U.S. PATENT DOCUMENTS

| | | | |
|---|---|---|---|
| 10,026,943 B2* | 7/2018 | Ichikawa | H01M 2/202 |
| 2012/0208410 A1 | 8/2012 | Ikeda et al. | |
| 2015/0279520 A1 | 10/2015 | Koda | |
| 2016/0268579 A1 | 9/2016 | Ichikawa et al. | |
| 2017/0179459 A1* | 6/2017 | Sato | H01M 2/206 |

FOREIGN PATENT DOCUMENTS

| | | |
|---|---|---|
| CN | 104813416 A | 7/2015 |
| JP | 2014-87192 A | 5/2014 |
| WO | 2015/099070 A1 | 7/2015 |

\* cited by examiner

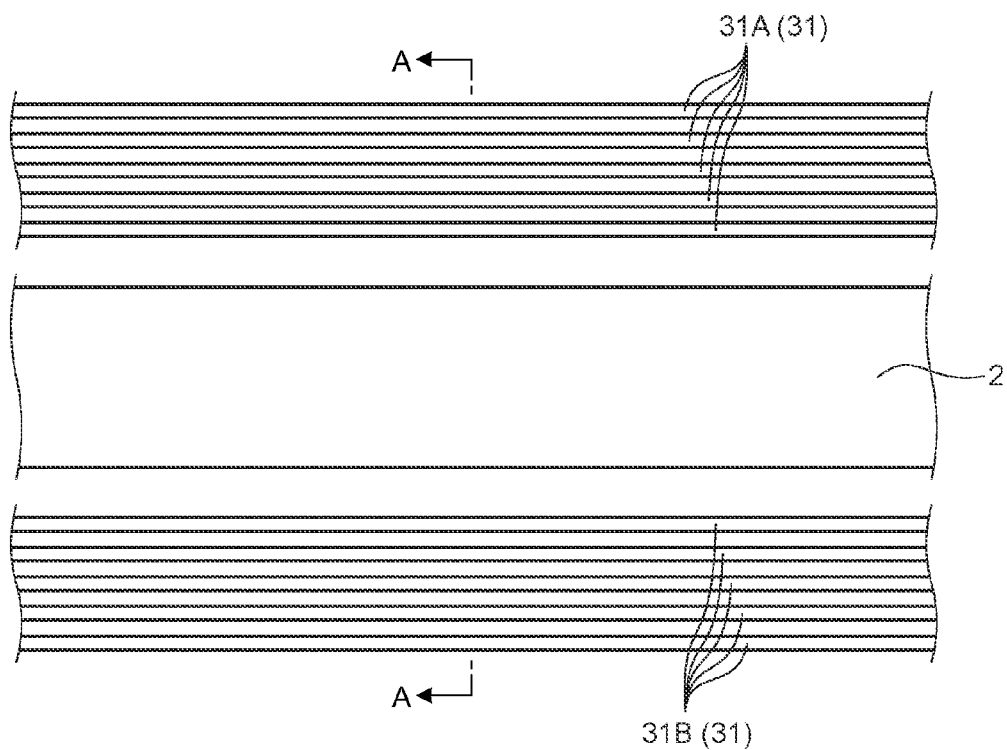
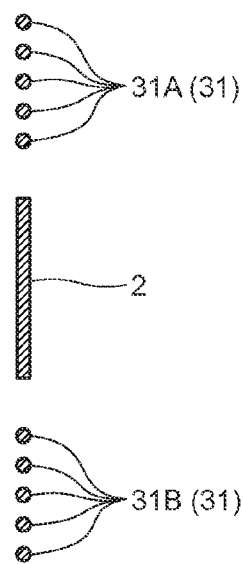

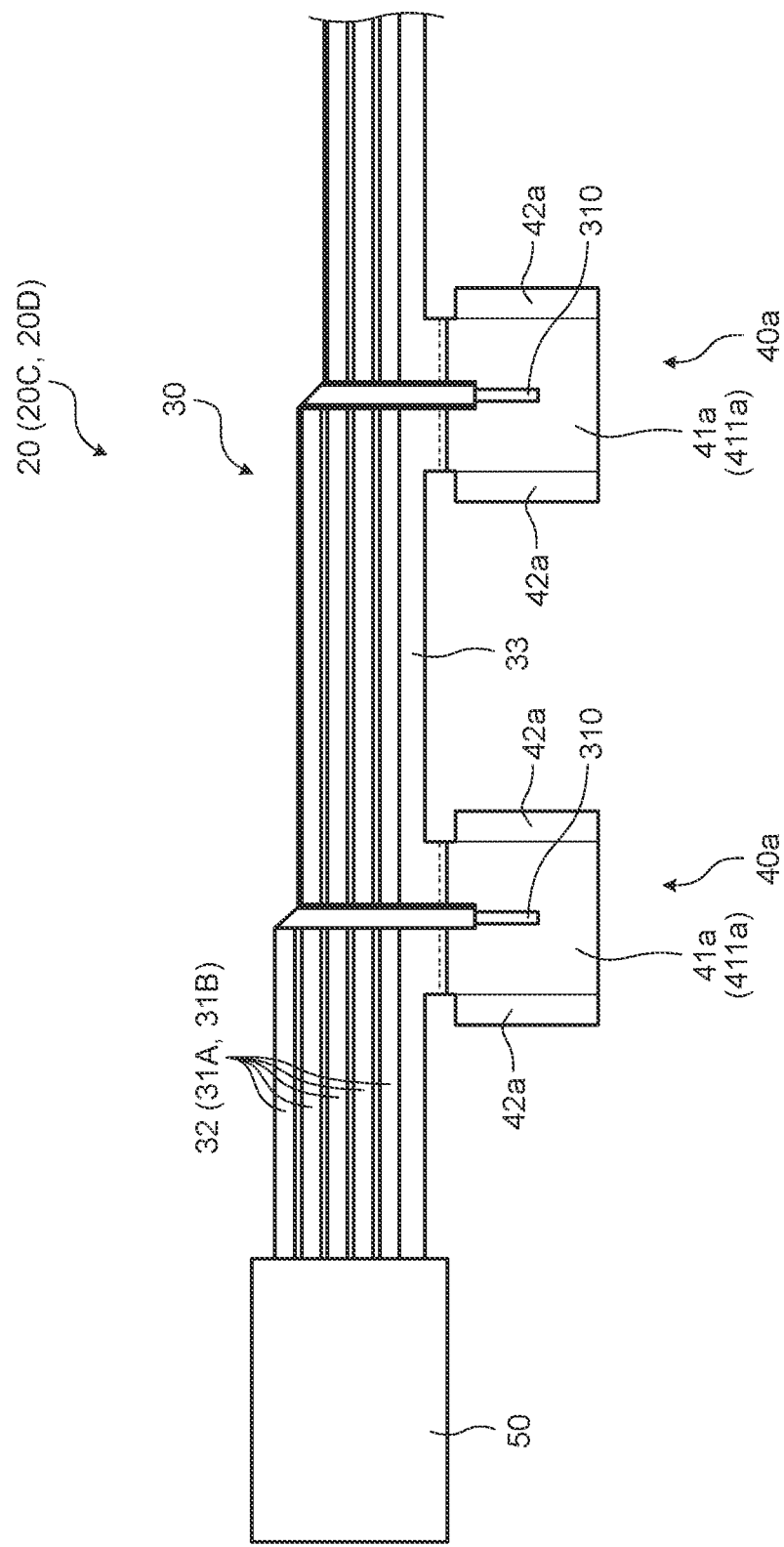

METHOD FOR MANUFACTURING BUSBAR MODULES

CROSS-REFERENCE TO RELATED APPLICATION(S)

The present application claims priority to and incorporates by reference the entire contents of Japanese Patent Application No. 2015-248012 filed in Japan on Dec. 18, 2015.

BACKGROUND OF THE INVENTION

1. Field of the Invention

The present invention relates to a method for manufacturing busbar modules and a method for manufacturing a battery pack.

2. Description of the Related Art

Conventional electric and hybrid vehicles include a battery module composed of many battery cells arranged side by side and connected in series or parallel in view of the output power and the driving range, for example. The battery cells of the battery module are arranged side by side so that one of two electrode terminals of each cell is linearly aligned with one another and the other electrode terminal of each cell is linearly aligned with one another. The battery module is housed in a housing with the cells housed in chambers in the housing. The battery module constitutes a battery pack together with other components such as a busbar module. The busbar module is provided, for example, for each set of electrode terminals that are linearly aligned. The busbar module includes at least a plurality of busbars each electrically connecting electrode terminals of the battery cells adjacent to each other, and a plurality of linear conductors that are provided for the busbars one by one and are electrically connected to the busbars (refer to, for example, WO 2015/099070). Such a busbar module is manufactured by extrusion of an insulating cover material together with a plurality of linear conductors and a planar conductor from which the busbars are formed. The insulating cover material covers the linear conductors and integrates the linear conductors with the busbars.

However, the conventional process of manufacturing busbar modules and the conventional process of manufacturing a battery pack including a battery module to which the busbar modules are applied generate cutting waste of the planar conductor and the linear conductors.

SUMMARY OF THE INVENTION

The present invention has been made in view of the foregoing, and it is an object of the present invention to provide a method for manufacturing busbar modules and a method for manufacturing a battery pack that can reduce the cutting waste of a planar conductor and linear conductors in the manufacturing process of the busbar modules and the battery pack.

In order to achieve the above mentioned object, a method for manufacturing busbar modules according to one aspect of the present invention includes a covering step of placing a plurality of first linear conductors on one side and a plurality of second linear conductors on the other side across a long planar conductor, and extruding an insulating cover material to cover the first linear conductors and join the first linear conductors to the planar conductor with the insulating cover material, and to cover the second linear conductors and join the second linear conductors to the planar conductor with the insulating cover material; and a cutting step of cutting the planar conductor along first cutting lines, second cutting lines, and third cutting lines that have been set in advance to form a plurality of busbars, and forming a first busbar module including the first linear conductors and the busbars joined to the first linear conductors, and a second busbar module including the second linear conductors and the busbars joined to the second linear conductors, wherein the first cutting lines are cutting lines that extend in a direction orthogonal to a longitudinal direction of the planar conductor and along which the planar conductor is cut to form the busbars, the second cutting lines are cutting lines that extend in the longitudinal direction of the planar conductor and along which every other joint portion of a plurality of joint portions is cut out, the joint portions are portions at which the busbars are joined to the first linear conductors with the insulating cover material, and the third cutting lines are cutting lines that extend in the longitudinal direction of the planar conductor and along which a plurality of joint portions are cut out, the joint portions are portions at which busbars other than the busbars to which the second cutting lines are set are joined to the second linear conductors with the insulating cover material.

According to another aspect of the present invention, in the method for manufacturing busbar modules, it is preferable that the first cutting lines are set such that a distance between the busbars in an alignment direction of the busbars is longer than a distance between electrode terminals to which the busbars are joined.

According to still another aspect of the present invention, in the method for manufacturing busbar modules, it is preferable that the cutting is performed along the first cutting lines, the second cutting lines, the third cutting lines, and fourth cutting lines that have been set in advance, the fourth cutting lines are cutting lines that are set at least on a region of each busbar, the region being other than a joint portion at which the busbar is joined to the first linear conductors or the second linear conductors, and along which portions are cut out of the busbar, one of the portions being cut out from one end of the busbar in an alignment direction of the busbars and another portion being cut out from another end of the busbar in the alignment direction of the busbars.

According to still another aspect of the present invention, a method for manufacturing a battery pack includes a covering step of placing a plurality of first linear conductors on one side and a plurality of second linear conductors on the other side across a long planar conductor, and extruding an insulating cover material to cover the first linear conductors and join the first linear conductors to the planar conductor with the insulating cover material, and to cover the second linear conductors and join the second linear conductors to the planar conductor with the insulating cover material; a cutting step of cutting the planar conductor along first cutting lines, second cutting lines, and third cutting lines that have been set in advance to form a plurality of busbars, and to form a first busbar module including the first linear conductors and the busbars joined to the first linear conductors, and a second busbar module including the second linear conductors and the busbars joined to the second linear conductors; a connecting step of electrically connecting the first linear conductors to the corresponding busbars of the first busbar module, and electrically connecting the second linear conductors to the corresponding busbars of the second busbar module; and a joining step of joining connection portions of the busbars of at least one of the first busbar module and the second busbar module to electrode terminals of a battery module composed of a plurality of battery cells, wherein the first cutting lines are cutting lines that extend in a direction orthogonal to a longitudinal direction of the planar conductor and along which the planar conductor is cut to form the busbars, the second cutting lines are cutting lines that extend in the longitudinal direction of the planar conductor and along which every other joint portion of a plurality of joint portions is cut out, the joint portions are portions at which the busbars are joined to the first linear conductors with the insulating cover material, and the third cutting lines are cutting lines that extend in the longitudinal direction of the planar conductor and along which a plurality of joint portions are cut out, the joint portions are portions at which busbars other than the busbars to which the second cutting lines are set are joined to the second linear conductors with the insulating cover material.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a plan view illustrating a placing step for forming busbar modules according to the embodiment;

FIG. 3 is a cross-sectional view taken along line A-A in FIG. 2;

FIG. 15 is a plan view illustrating a connecting step for the busbar modules according to the modification.

DETAILED DESCRIPTION OF THE PREFERRED EMBODIMENT

An embodiment of the present invention will be described in detail with reference to the accompanying drawings. The content described in the following embodiment is not intended to limit the scope of the present invention. Components described below include components that can be easily thought of by the skilled person or components that are substantially the same. Configurations described below can be combined as appropriate. Moreover, omissions, substitutions, or alterations of the configurations may be performed without departing from the gist of the present invention.

Embodiment

Figure 1:
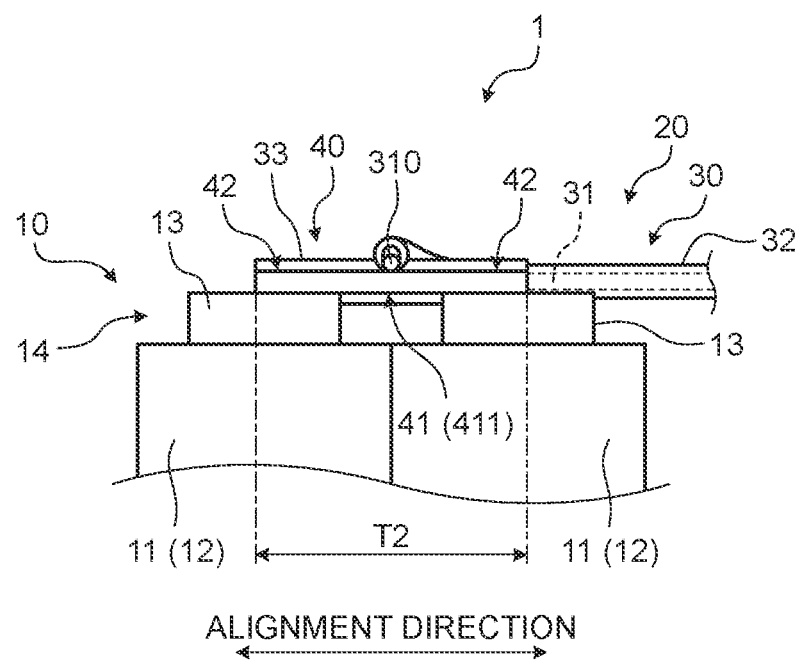
FIG. 1 is a front view illustrating an example of a configuration of main components of a battery pack manufactured by a method for manufacturing a battery pack according to an embodiment.

First, a method for manufacturing busbar modules and a method for manufacturing a battery pack according to an embodiment will be described. A battery pack 1 is manufactured according to the method for manufacturing a battery pack according to the embodiment. The battery pack 1 is an on-board battery for a vehicle such as an electric vehicle or a hybrid vehicle, and includes a battery module 10 and a busbar module 20 as illustrated in FIG. 1. The battery module 10 is an assembly composed of a plurality of battery cells 11. The busbar module 20 is an assembly composed of a plurality of busbars 40 and a flat cable 30. The busbar module 20 electrically connects the battery cells 11 of the battery module 10 in series or in parallel. The battery pack 1 includes a housing (not illustrated), and the battery module 10 is housed in the housing with the battery cells 11 housed in chambers in the housing.

Each battery cell 11 has two electrode terminals 13 on one end of a cell body 12. The cell body 12 of the battery cell 11 has, for example, a rectangular parallelepiped shape, and the electrode terminals 13 are disposed on a surface of the cell body 12. In this example, the surface on which the electrode terminals 13 are disposed faces the upper side of the vehicle. The battery cell 11 has two planer electrode terminals 13 disposed at both ends of the surface in the longitudinal direction thereof. One of the electrode terminals 13 is a positive electrode terminal and the other is a negative electrode terminal.

The battery cells 11 of the battery module 10 are arranged side by side so that one of the two electrode terminals 13 of each cell 11 is linearly aligned with one another and the other electrode terminal 13 of each cell 11 is linearly aligned with one another. In other words, the battery cells 11 constitute the battery module 10 and form an imaginary rectangular parallelepiped shape, and the battery module 10 has two electrode terminal sets 14 each composed of the electrode terminals 13 that are linearly aligned on a surface of the rectangular parallelepiped shape. An electrode terminal set 14 of the battery module 10 may be composed of positive electrode terminals 13 and negative electrode terminals 13 alternately arranged in a row, or composed of only positive electrode terminals 13 or negative electrode terminals 13 arranged in a row. The battery pack 1 according to the present embodiment includes the busbar module 20 provided for each electrode terminal set 14.

The busbar module 20 is manufactured by the method for manufacturing a busbar module according to the present embodiment and includes the flat cable 30 and the busbars 40 as described above. The busbars 40 are aligned in a direction in which the electrode terminals 13 are aligned, and are held by a busbar holder 33 of the flat cable 30 to be described later. The direction in which the busbars 40 are aligned is referred to as an alignment direction of the busbars 40. A direction orthogonal to the alignment direction of the busbars 40 on an imaginary plane configured of a plurality of linear conductors 31 of the flat cable 30 to be described later is referred to as an alignment orthogonal direction of the busbars 40. The electrode terminals 13 of each electrode terminal set 14 of the battery cells 11 are aligned in the same direction as the alignment direction of the busbars 40.

The flat cable 30 holds the busbars 40 and electrically connects the busbars 40 with a connector 50 (see FIG. 9) of the flat cable 30. The flat cable 30 includes a plurality of linear conductors 31, a cover 32 that covers the linear conductors 31, and the busbar holder 33 that holds the busbars 40. The cover 32 and the busbar holder 33 of the flat cable 30 are made of an insulating cover material 4 to be described later. The connector 50 of the flat cable 30 is fitted to a counterpart connector (not illustrated) and thus all the linear conductors 31 are connected with conductors of the counterpart connector. The flat cable 30 may be connected with the counterpart conductors by welding without using the connector 50. The flat cable 30 will be described in detail below.

The linear conductors 31 are used for, for example, detecting the voltage of the battery cells 11 as voltage detecting lines. The linear conductors 31 are made of, for example, copper alloy or aluminum alloy and are flexible enough to be processed by bending. The linear conductors 31 may be single wires such as flat conductors or round conductors, stranded wires, or other types of conductors. The linear conductors 31 are preferably provided for the busbars 40 one by one. The linear conductors 31 are arranged on the same plane with their axes extending in the same direction and with a certain gap therebetween in the direction orthogonal to the axial direction. The axial direction of the linear conductors 31 agrees with the alignment direction of the busbars 40. The linear conductors 31 are arranged such that the imaginary plane configured of the linear conductors 31 is substantially parallel to the upper surface of each busbar 40. When only a limited number of the linear conductors 31 can be arranged on the same plane, the linear conductors 31 may be arranged in a stack such that a certain number of linear conductors 31 arranged on the same plane as a set are stacked in the direction orthogonal to the plane.

The cover 32 covers the linear conductors 31 and is formed of the insulating cover material 4. The insulating cover material 4 is made of, for example, a synthetic resin having an insulating property and flexibility. The insulating cover material 4 is made of, for example, a synthetic resin (insulating cover material) such as polypropylene (PP), polyvinyl chloride (PVC), polybutylene terephthalate (PBT), or polyethylene terephthalate (PET). The cover 32 covers the linear conductors 31 without changing their arrangement described above. The cover 32 covers the linear conductors 31 with a certain gap left therebetween and integrates them. For example, the cover 32 includes a circular tube portion that covers the individual linear conductor 31 and a rectangular flat portion that joins adjacent circular tube portions.

The busbar holder 33 has a planar rectangular shape and is made of the insulating cover material 4. The busbar holder 33 extends, on the aforementioned imaginary plane, from an end of the cover 32 close to the busbars 40 to the direction orthogonal to the axial direction of the linear conductors 31. The busbar holder 33 holds the busbars 40 at an end away from the cover 32. Portions of the busbar holder 33 at which the busbars 40 are joined to the busbar holder 33 function as joint portions 330 (see FIG. 6). Some of the joint portions 330 of the busbar holder 33 are cut as will be described later.

Each busbar 40 electrically connects two electrode terminals 13 adjacent to each other in an electrode terminal set 14. The busbars 40 are aligned in the alignment direction of the electrode terminals 13 of the electrode terminal set 14, and are fixed to the busbar holder 33 of the flat cable 30. The busbars 40 are formed by presswork such as punching performed on a planar conductor that is a base material of the busbars 40, which will be described later. The planar conductor is a rectangular long metal plate made of, for example, copper, copper alloy, aluminum, aluminum alloy, gold, or stainless steel (SUS). Each busbar 40 has a planar rectangular shape, and has a base portion 41 and two connection portions 42. The base portion 41 has a base body 411 and a held portion 43 (see FIG. 7). The two connection portions 42 of each busbar 40 are arranged in the alignment direction of the busbars 40 with the base body 411 interposed therebetween. The two connection portions 42 are electrically connected to the electrode terminals 13 adjacent to each other in an electrode terminal set 14. The held portion 43 is located at an end of each busbar 40 close to the flat cable 30 in the alignment orthogonal direction of the busbars 40, and is held by the busbar holder 33.

Figure 10:
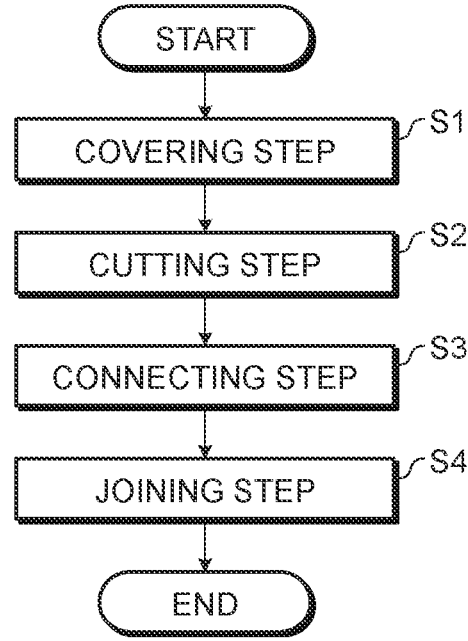
FIG. 10 is a flowchart illustrating the procedure for manufacturing the busbar modules according to the embodiment.

The method for manufacturing busbar modules according to the embodiment includes a covering step and a cutting step as illustrated in FIG. 10. The method for manufacturing a battery pack further includes a connecting step and a joining step in addition to the steps of the method for manufacturing busbar modules.

Figure 4:
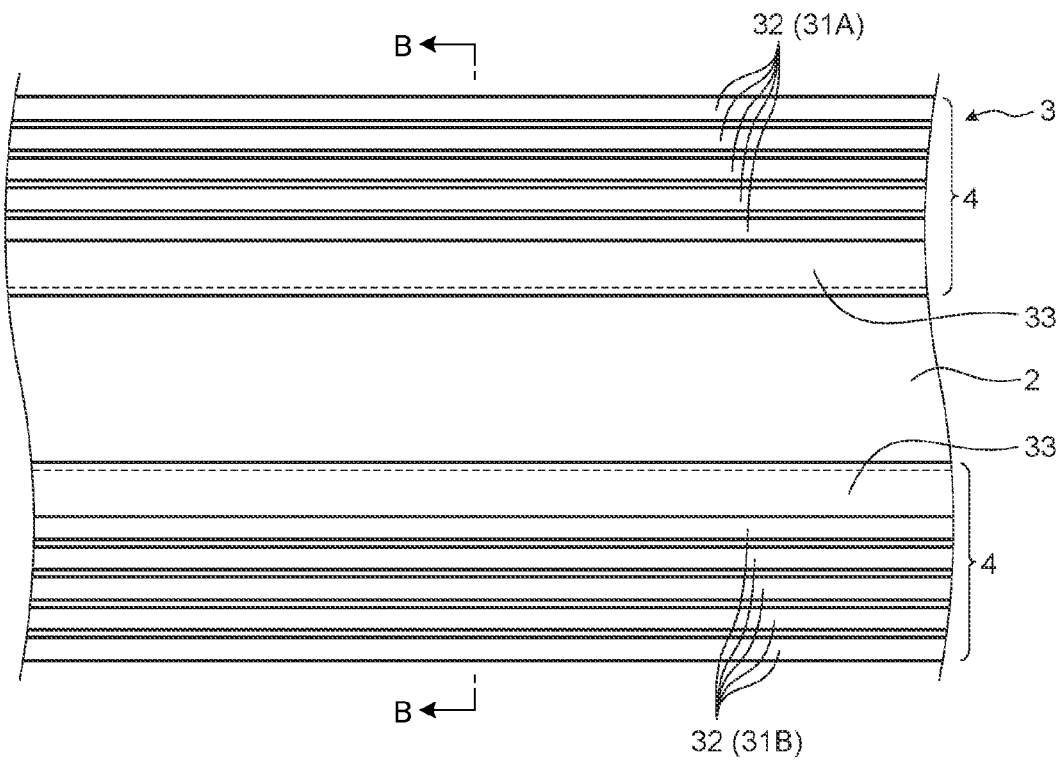
FIG. 4 is a plan view illustrating a covering step for forming the busbar modules according to the embodiment.
Figure 5:
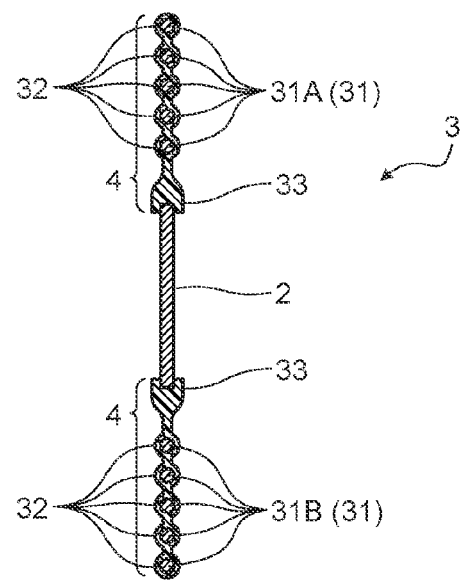
FIG. 5 is a cross-sectional view taken along line B-B in FIG. 4.

At the covering step, the linear conductors 31 are covered, and the linear conductors 31 are integrated with a long planar conductor 2 from which the busbars 40 are formed (Step S1). At a placing step, for example, as illustrated in FIGS. 2 and 3, a plurality of first linear conductors 31A are placed on one side and a plurality of second linear conductors 31B are placed on the other side across the planar conductor 2. The first and the second linear conductors 31A and 31B are placed on the same plane with their axes extending in the same direction and with a certain gap therebetween in the direction orthogonal to the axial direction. At the covering step, as illustrated in FIGS. 4 and 5, the insulating cover material 4 is extruded and the first linear conductors 31A are covered with the insulating cover material 4 to form band-like first linear conductors 31A, and an end of the first linear conductors 31A close to the planar conductor 2 is joined to the planar conductor 2 with the insulating cover material 4. At the covering step, the second linear conductors 31B are covered with the insulating cover material 4 to form band-like second linear conductors 31B, and an end of the second linear conductors 31B close to the planar conductor 2 is joined to the planar conductor 2 with the insulating cover material 4. Specifically, a plurality of reels on which base materials of the first and the second linear conductors 31A and 31B are wound and a reel on which base material of the planar conductor 2 is wound are coaxially placed in a known extruder. For example, the base material of the planar conductor 2 is placed in the extruder between the base material of the first linear conductors 31A and the base material of the second linear conductors 31B. The extruder draws the base materials of the first and the second linear conductors 31A and 31B and the base material of the planar conductor 2 from the respective reels and places these base materials on the same plane. The base materials are placed parallel to each other with a certain gap left therebetween in a direction orthogonal to the axial direction of the first and the second linear conductors 31A and 31B. The insulating cover material 4 is extruded to the first and the second linear conductors 31A and 31B and to the joint portions 330 between the planar conductor 2 and the first linear conductors 31A, and between the planar conductor 2 and the second linear conductors 31B. At the covering step, the first and the second linear conductors 31A and 31B are covered, an end of the first linear conductors 31A close to the planar conductor 2 is joined to an end of the planar conductor 2 close to the first linear conductors 31A, and an end of the second linear conductors 31B close to the planar conductor 2 is joined to an end of the planar conductor 2 close to the second linear conductors 31B, thereby forming a flat circuit body 3.

Figure 6:
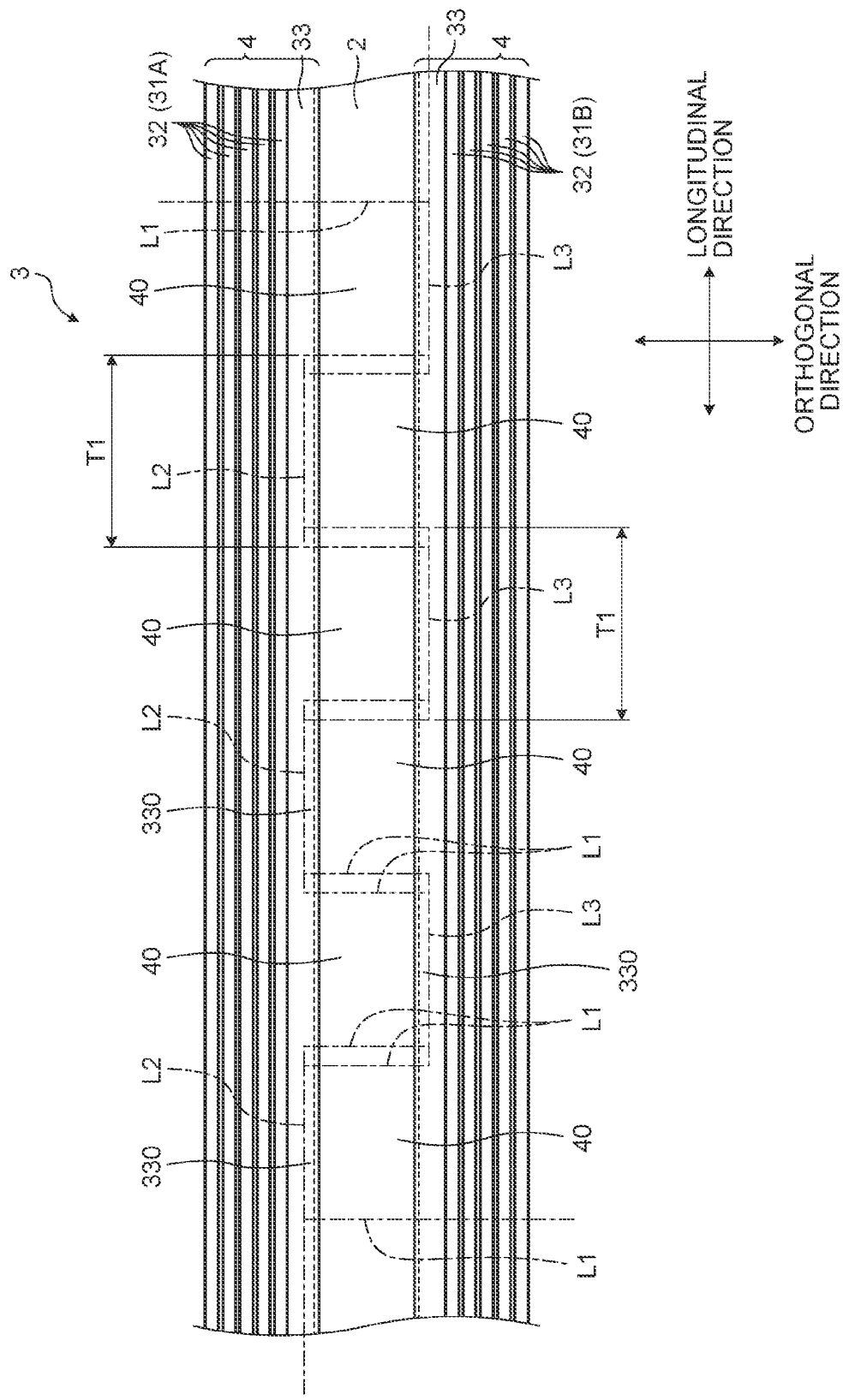
FIG. 6 is a plan view illustrating an example of cutting lines set for the busbar modules according to the embodiment.
Figure 7:
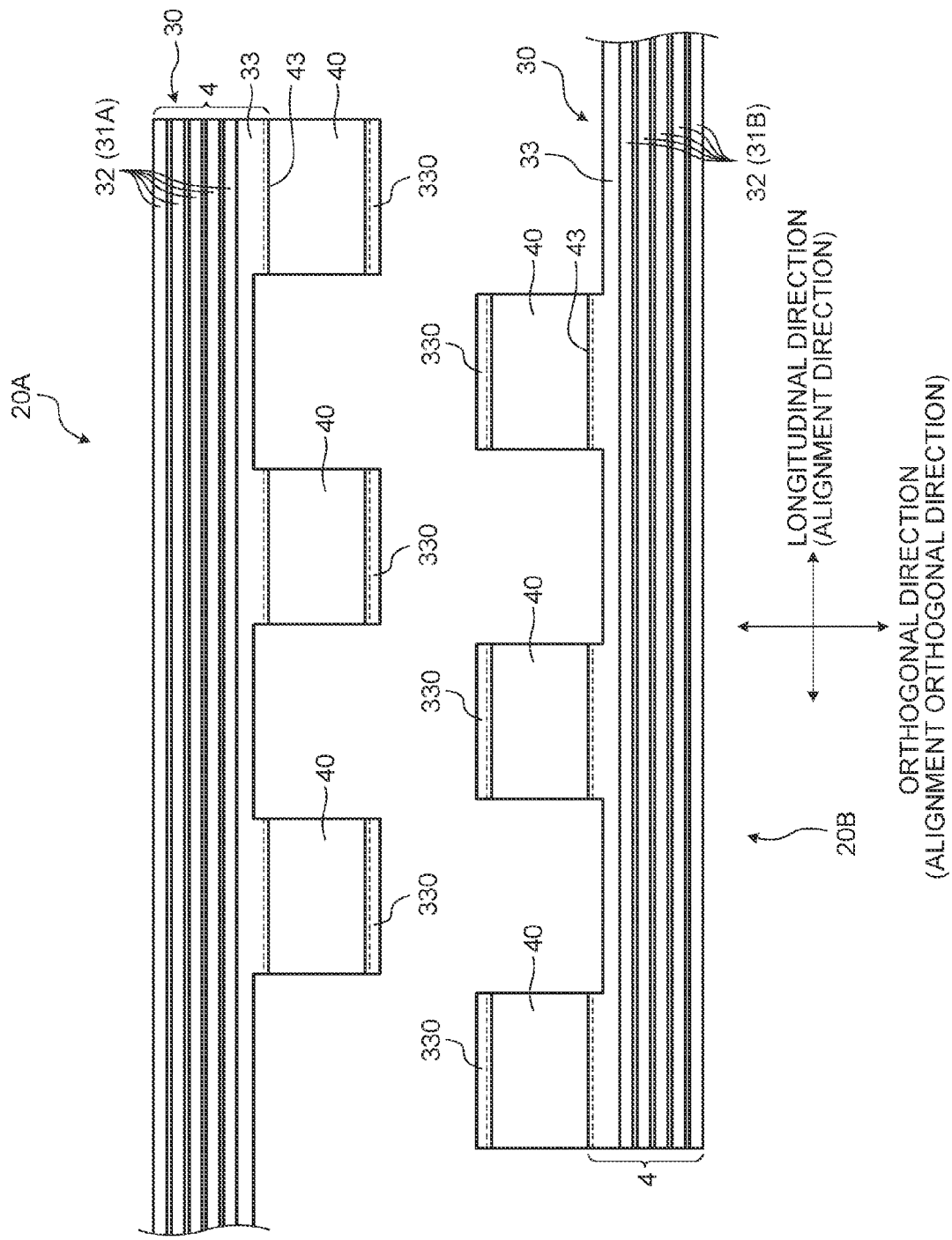
FIG. 7 is a plan view illustrating a first cutting step for the busbar modules according to the embodiment.

At the cutting step, as illustrated in FIGS. 6 and 7, the flat circuit body 3 is cut along first cutting lines L1, second cutting lines L2, and third cutting lines L3 that have been set in advance to form a first busbar module 20A including the first linear conductors 31A and busbars 40 that are joined to the first linear conductors 31A and a second busbar module 20B including the second linear conductors 31B and busbars 40 that are joined to the second linear conductors 31B (Step S2). The first cutting lines L1 are cutting lines that extend in a direction orthogonal to the longitudinal direction of the planar conductor 2 and along which the planar conductor 2 is cut to form a plurality of busbars 40. For example, the first cutting lines L1 are set such that they are spaced apart at intervals corresponding to the length of a busbar 40 in the alignment direction of the busbars 40 and each extend in the direction orthogonal to the longitudinal direction of the planar conductor 2. For example, the planar conductor 2 is punched by a pressing machine to be described later along the first cutting lines L1. In this case, each first cutting line L1 is set based on the shape of the cutting blade of the pressing machine that punches the planar conductor 2. For example, each first cutting line L1 is composed of two cutting lines spaced apart at a distance corresponding to the thickness of the cutting blade of the punching machine and extending in the direction orthogonal to the longitudinal direction of the planar conductor 2, and two cutting lines extending in the longitudinal direction of the planar conductor 2 from the upper and the lower side of the aforementioned two lines. When a laser beam is used for cutting, the first cutting lines L1 may have a linear shape having no thickness in the longitudinal direction of the planar conductor 2. The second cutting lines L2 are cutting lines that extend in the longitudinal direction of the planar conductor 2 and along which every other joint portion of a plurality of joint portions 330 is cut out, the joint portions 330 at which the busbars 40 are joined to the first linear conductors 31A with the insulating cover material 4. For example, the second cutting lines L2 are set such that each second cutting line L2 has the length of the busbar 40 in the alignment direction of the busbars 40 and extends in the alignment direction of the busbars 40. Each second cutting line L2 crosses ends of the first cutting lines L1 close to the first linear conductors 31A. The third cutting lines L3 are cutting lines that extend in the longitudinal direction of the planar conductor 2 and along which a plurality of joint portions 330 are cut out, the joint portions 330 at which busbars 40 that are different from the busbars 40 to which the second cutting lines L2 are set are joined to the second linear conductors 31B with the insulating cover material 4. The third cutting lines L3 are set such that each third cutting line L3 has the length of the busbar 40 in the alignment direction of the busbars 40 and extends in the alignment direction of the busbars 40. Each third cutting line L3 crosses other ends of the first cutting lines L1 close to the second linear conductors 31B.

The first cutting lines L1 are set such that a distance T1 between the busbars 40 in the alignment direction of the busbars 40 is longer than a distance T2 between the electrode terminals 13 to which the busbars 40 are joined. The distance T1 between the busbars 40 is a distance between ends of adjacent busbars 40 that face each other in the alignment direction of the busbars 40. The distance T2 between the electrode terminals 13 is a distance between the centers of adjacent electrode terminals 13 in the alignment direction of the electrode terminals 13. The first cutting lines L1 are set such that the distance T1 between the busbars 40 is longer than the distance T2 between the electrode terminals 13 by a length of a portion punched out in the presswork for forming the busbars 40. This configuration allows the busbar module 20 to absorb distance errors between the electrode terminals 13.

Figure 8:
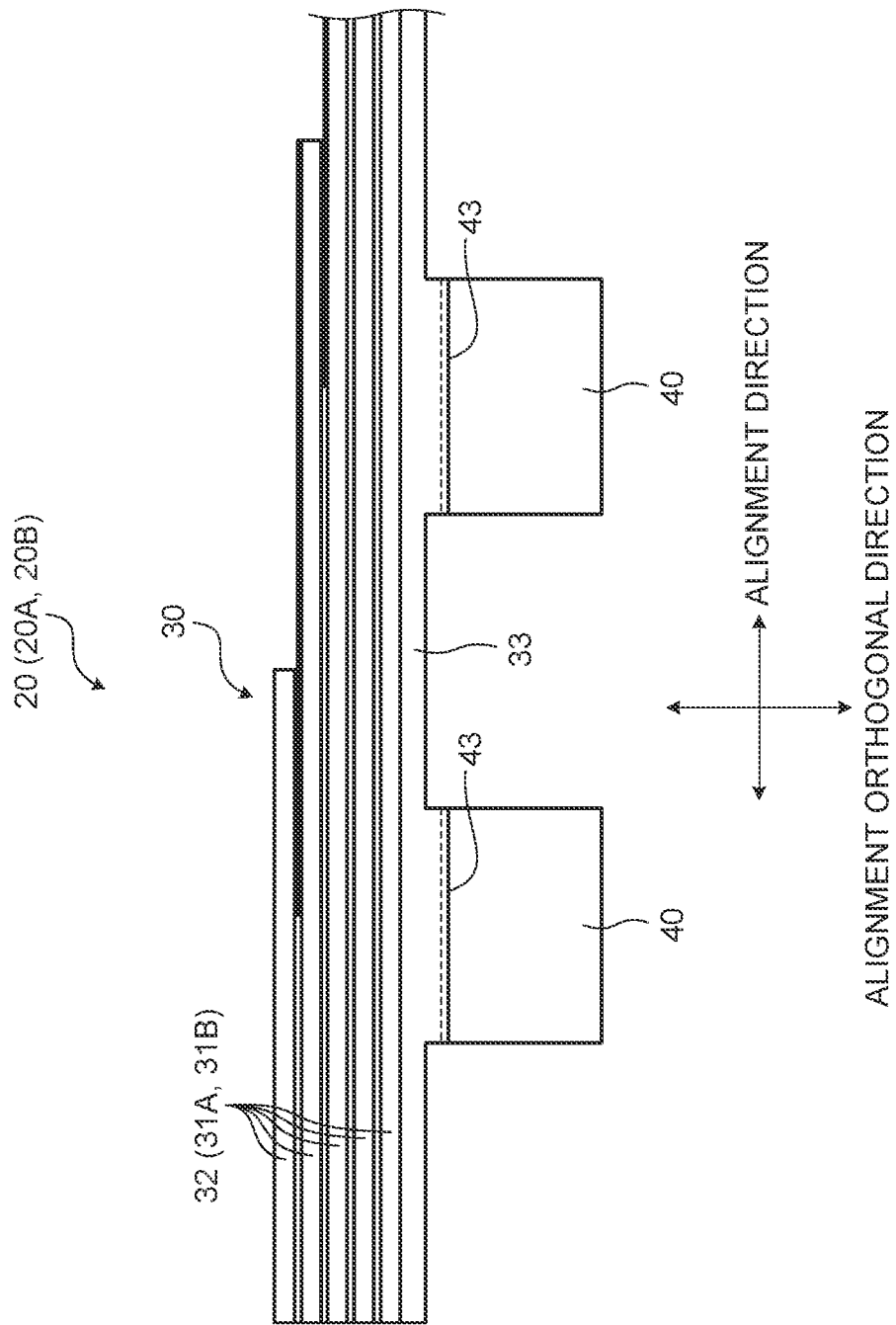
FIG. 8 is a plan view illustrating a second cutting step for the busbar modules according to the embodiment.

At the cutting step, for example, the flat circuit body 3 is placed in a known pressing machine. The pressing machine punches the planar conductor 2 along the first cutting lines L1 to form the busbars 40. The pressing machine also cuts joint portions 330 between the busbars 40 and the first linear conductors 31A along the second cutting lines L2, and cuts joint portions 330 between the busbars 40 and the second linear conductors 31B along the third cutting lines L3. The first and the second busbar modules 20A and 20B are thus formed. At the cutting step, as illustrated in FIG. 8, the first and the second linear conductors 31A and 31B are cut to certain lengths corresponding to the busbars 40 to which the first and the second linear conductors 31A and 31B are electrically connected. At the cutting step, the joint portions 330 made of the insulating cover material 4 and bonded to an end of the busbars 40 away from the busbar holder 33 in the alignment orthogonal direction of the busbars 40 are removed.

Figure 9:
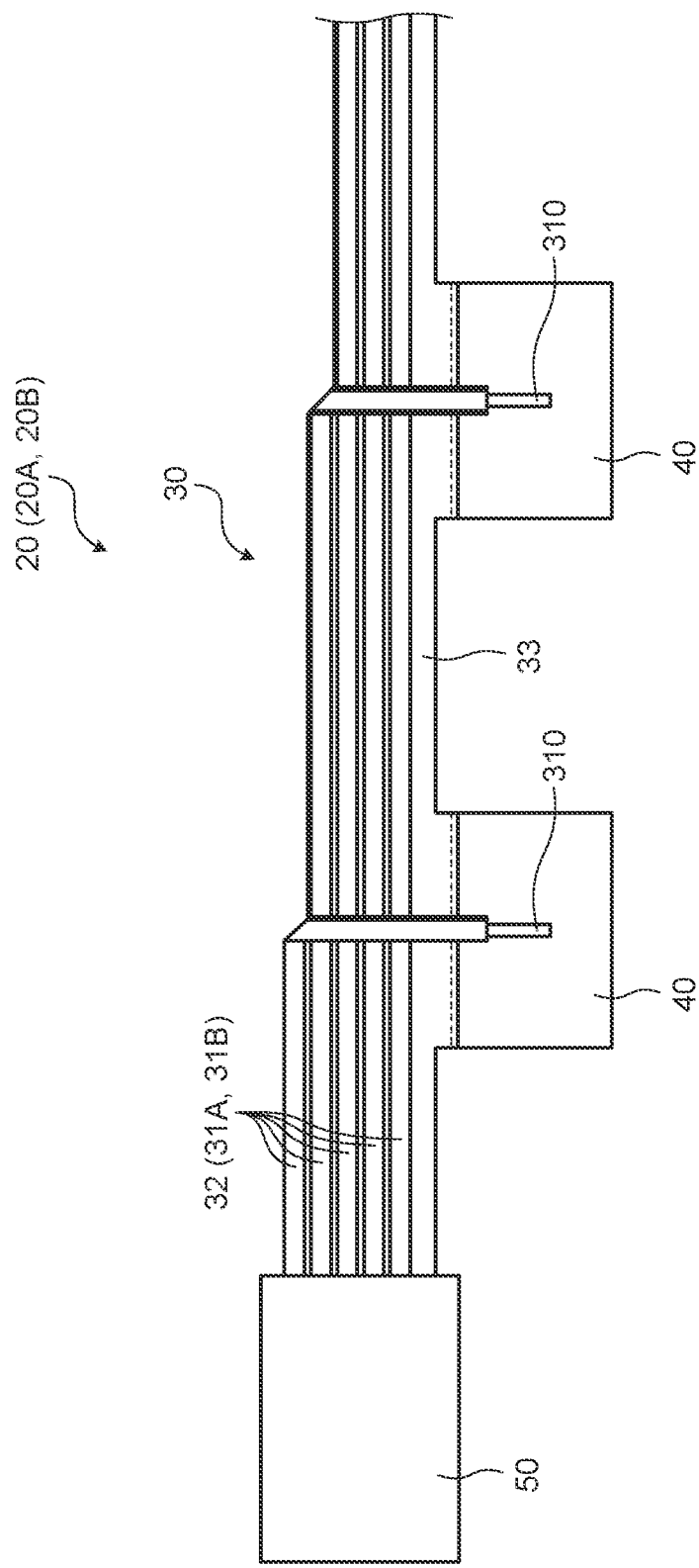
FIG. 9 is a plan view illustrating a connecting step for the busbar modules according to the embodiment.

At the connecting step, as illustrated in FIG. 9, the first linear conductors 31A are electrically connected to the corresponding busbars 40 of the first busbar module 20A, and the second linear conductors 31B are electrically connected to the corresponding busbars 40 of the second busbar module 20B (Step S3). The individual first linear conductor 31A corresponding to the busbars 40 out of the first linear conductors 31A of the first busbar module 20A is bent on the busbar 40 side and an end 310 of the first linear conductor 31A is electrically connected to the upper surface (a surface away from the electrode terminals 13) of the busbar 40 by, for example, welding or brazing. In this case, the cover 32 is stripped from the end 310 of the first linear conductor 31A, and the bare end 310 is connected to the upper surface of the busbar 40. The individual second linear conductor 31B corresponding to the busbars 40 out of the second linear conductors 31B of the second busbar module 20B is bent on the busbar 40 side and an end 310 of the second linear conductor 31B is electrically connected to the upper surface (a surface away from the electrode terminals 13) of the busbar 40 by, for example, welding or brazing. In this case, the cover 32 is stripped from the end 310 of the second linear conductor 31B, and the bare end 310 is connected to the upper surface of the busbar 40. The connector 50 is attached to an end of the first linear conductors 31A of the first busbar module 20A and another connector 50 is attached to an end of the second linear conductors 31B of the second busbar module 20B. The first and the second busbar modules 20A and 20B are thus completed in the present embodiment. The first and the second linear conductors 31A and 31B may be electrically connected to the busbars 40 by using a conductor member (not illustrated) prepared for this purpose.

At the joining step, the connection portions 42 of the busbars 40 of at least one of the first busbar module 20A and the second busbar module 20B are joined to the electrode terminals 13 of the battery module 10 composed of a plurality of battery cells 11 (Step S4). For example, the connection portions 42 of the busbars 40 are directly joined to the electrode terminals 13. Examples of the methods for directly joining the connection portions 42 to the electrode terminals 13 include known methods such as resistance welding, ultrasonic bonding, and laser bonding. The connection portions 42 of the busbars 40 are joined to the electrode terminals 13 such that, for example, voltage is applied to the connection portions 42 with the connection portions 42 being in contact with the electrode terminals 13 and heat generated by the resistance of the connection portions 42 melts a part of the connection portions 42. The battery pack 1 is thus completed in the present embodiment.

As described above, the method for manufacturing busbar modules according to the present embodiment includes the cutting step at which the planar conductor 2 is cut along the first cutting lines L1, the second cutting lines L2, and the third cutting lines L3 that have been set in advance to form the first busbar module 20A including the first linear conductors 31A and busbars 40 that are joined to the first linear conductors 31A and the second busbar module 20B including the second linear conductors 31B and busbars 40 that are joined to the second linear conductors 31B. The first cutting lines L1 are cutting lines that extend in a direction orthogonal to the longitudinal direction of the planar conductor 2 and along which the planar conductor 2 is cut to form a plurality of busbars 40. The second cutting lines L2 are cutting lines that extend in the longitudinal direction of the planar conductor 2 and along which every other joint portion of a plurality of joint portions 330 is cut out, the joint portions 330 at which the busbars 40 are joined to the first linear conductors 31A with the insulating cover material 4. The third cutting lines L3 are cutting lines that extend in the longitudinal direction of the planar conductor 2 and along which a plurality of joint portions 330 are cut out, the joint portions 330 at which busbars 40 that are different from the busbars 40 to which the second cutting lines L2 are set are joined to the second linear conductors 31B with the insulating cover material 4. By a conventional method for manufacturing busbar modules, busbars of a first busbar module are sequentially formed in the longitudinal direction of the planar conductor, and are followed by busbars of a second busbar module sequentially formed in the longitudinal direction of the planar conductor. In such a conventional method for manufacturing busbar modules, portions of the planar conductor between the busbars are cut out, thereby generating pieces of cutting waste of the planar conductor in the cutting process. By the conventional method for manufacturing busbar modules, the busbars of the first busbar module and the busbars of the second busbar module are formed in series. This configuration increases the lengths of the first linear conductors and the second linear conductors of the flat circuit body extending in their axial direction, thereby generating cutting waste of the first and the second linear conductors. By the method for manufacturing busbar modules according to the present embodiment, the busbars 40 of the first busbar module 20A and the busbars 40 of the second busbar module 20B are alternately formed on the planar conductor 2 in the longitudinal direction of the planar conductor 2. In the method for manufacturing busbar modules according to the present embodiment, most of the portions of the planar conductor 2 to be cut out correspond to the regions between the busbars 40 that are alternately formed on the planar conductor 2. This configuration can reduce the cutting waste of the planar conductor 2. By the method for manufacturing busbar modules according to the present embodiment, the busbars 40 of the first busbar module 20A and the busbars 40 of the second busbar module 20B are alternately formed in the longitudinal direction of the planar conductor 2. This configuration can reduce the length of the first and the second linear conductors 31A and 31B of the flat circuit body 3 in their axial direction and can reduce the cutting waste of the first and the second linear conductors 31A and 31B. Thus, the yield of busbar module 20 can be improved by the method for manufacturing busbar modules according to the present embodiment, and the production cost of the busbar module 20 can be reduced.

In the method for manufacturing busbar modules according to the present embodiment, the first cutting lines L1 are set such that the distance between the busbars 40 in the alignment direction of the busbars 40 is longer than the distance between the electrode terminals 13 to which the busbars 40 are joined. With this configuration, the busbars 40 of the first and the second busbar modules 20A and 20B are joined to the electrode terminals 13 with the first and the second linear conductors 31A and 31B being bent, and thus can absorb the distance errors between the electrode terminals 13. This configuration can increase bending freedom of the first and the second linear conductors 31A and 31B of the first and the second busbar modules 20A and 20B, which can lower the height of the first and the second linear conductors 31A and 31B and can reduce the load on the first and the second linear conductors 31A and 31B.

The method for manufacturing a battery pack according to the present embodiment further includes the connecting step and the joining step. At the connecting step, the first linear conductors 31A are electrically connected to the corresponding busbars 40 of the first busbar module 20A and the second linear conductors 31B are electrically connected to the corresponding busbars 40 of the second busbar nodule 20B. At the joining step, the connection portions 42 of the busbars 40 of at least one of the first busbar module 20A and the second busbar module 20B are joined to the electrode terminals 13 of the battery module 10 composed of a plurality of battery cells 11. By the method for manufacturing a battery pack according to the present embodiment, the yield of the battery pack 1 can be improved, and the production cost of the battery pack 1 can be reduced.

Modification

Figure 11:
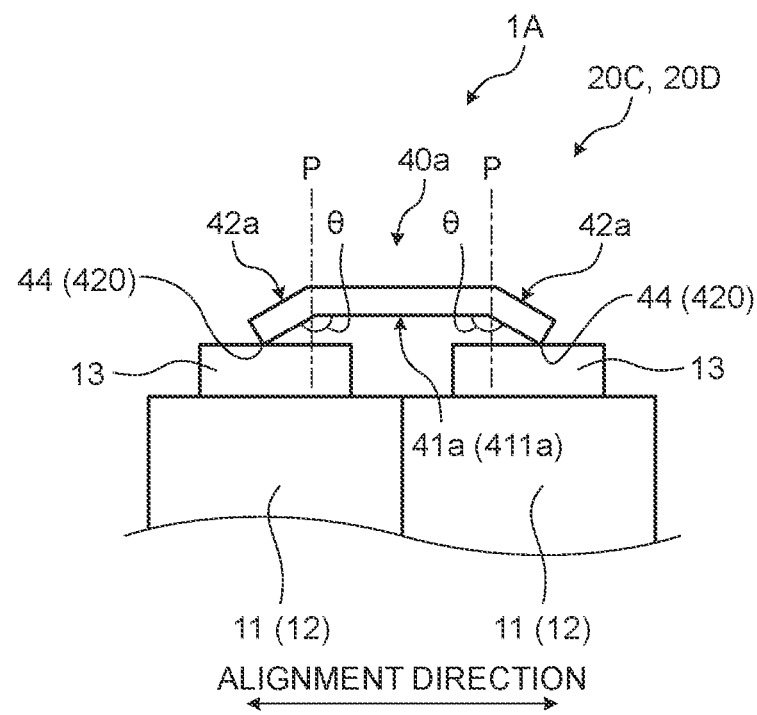
FIG. 11 is a front view illustrating an example of a configuration of main components of a battery pack manufactured by a method for manufacturing a battery pack according to a modification of the embodiment.

A method for manufacturing busbar modules and a method for manufacturing a battery pack according to a modification of the embodiment will be described. The modification differs from the embodiment in that first and second busbar modules 20C and 20D manufactured by the method for manufacturing busbar modules according to the modification and a battery pack 1A manufactured by the method for manufacturing a battery pack according to the modification include busbars 40a having connection portions 42a that are bent toward the electrode terminals 13 as illustrated in FIG. 11.

The connection portions 42a of the busbars 40a are connected to the electrode terminals 13 adjacent to each other. The connection portions 42a correspond to portions of the busbar 40a bent along the bending lines P so that the edges 44 of the busbar 40a in the alignment direction of the busbars 40a come close to the electrode terminals 13. Each connection portion 42a is defined as a part between an end (bending line P) of a base body 411a and an edge 420 of the connection portion 42a in the alignment direction of the busbars 40a. When seen from the alignment orthogonal direction of the busbars 40a, the connection portions 42a downwardly and outwardly extend from the base body 411a to incline relative to the base body 411a. When the connection portions 42a are seen from the alignment orthogonal direction of the busbars 40a, an angle θ between the base body 411a and each connection portion 42a is preferably an obtuse angle. The two connection portions 42a may be bent toward the electrode terminals 13 at the same angle, or may be bent toward the electrode terminals 13 at different angles. Alternatively, only one of the connection portions 42a may be bent toward the electrode terminals 13. The connection portions 42a, which are bent toward the electrode terminals 13, protrude toward the electrode terminals 13 relative to the base body 411a of a base portion 41a. The design value of the pitch between the two connection portions 42a agrees with the design value of the pitch between the two electrode terminals 13 adjacent to each other. For example, the design value of the pitch between the edges 420 of the connection portions 42a agrees with the design value of the pitch between the centers of the adjacent electrode terminals 13 in the alignment direction thereof. The edges 420 of the connection portions 42a are directly joined to the respective electrode terminals 13. Examples of the method for directly joining the edges 420 to the electrode terminals 13 include resistance welding, ultrasonic bonding, laser bonding, and other known methods. For example, voltage is applied to the edges 420 of the two connection portions 42a with the edges 420 being in contact with the electrode terminals 13, and heat generated by the resistance of the edges 420 melts the edges 420, thereby joining the edges 420 of the connection portions 42a to the electrode terminals 13.

The method for manufacturing busbar modules according to the modification includes a covering step, a cutting step, and a bending step. The method for manufacturing a battery pack according to the modification further includes a connecting step and a joining step in addition to the steps of the method for manufacturing busbar modules. The same explanation will be omitted as appropriate if the content of the method for manufacturing busbar modules and the content of the method for manufacturing a battery pack according to the modification are the same as those of the embodiment.

At the covering step, in the same manner as in the covering step of the embodiment, the insulating cover material 4 is extruded to cover the linear conductors 31 and integrate the linear conductors 31 with the long planar conductor 2 from which the busbars 40a are formed.

Figure 12:
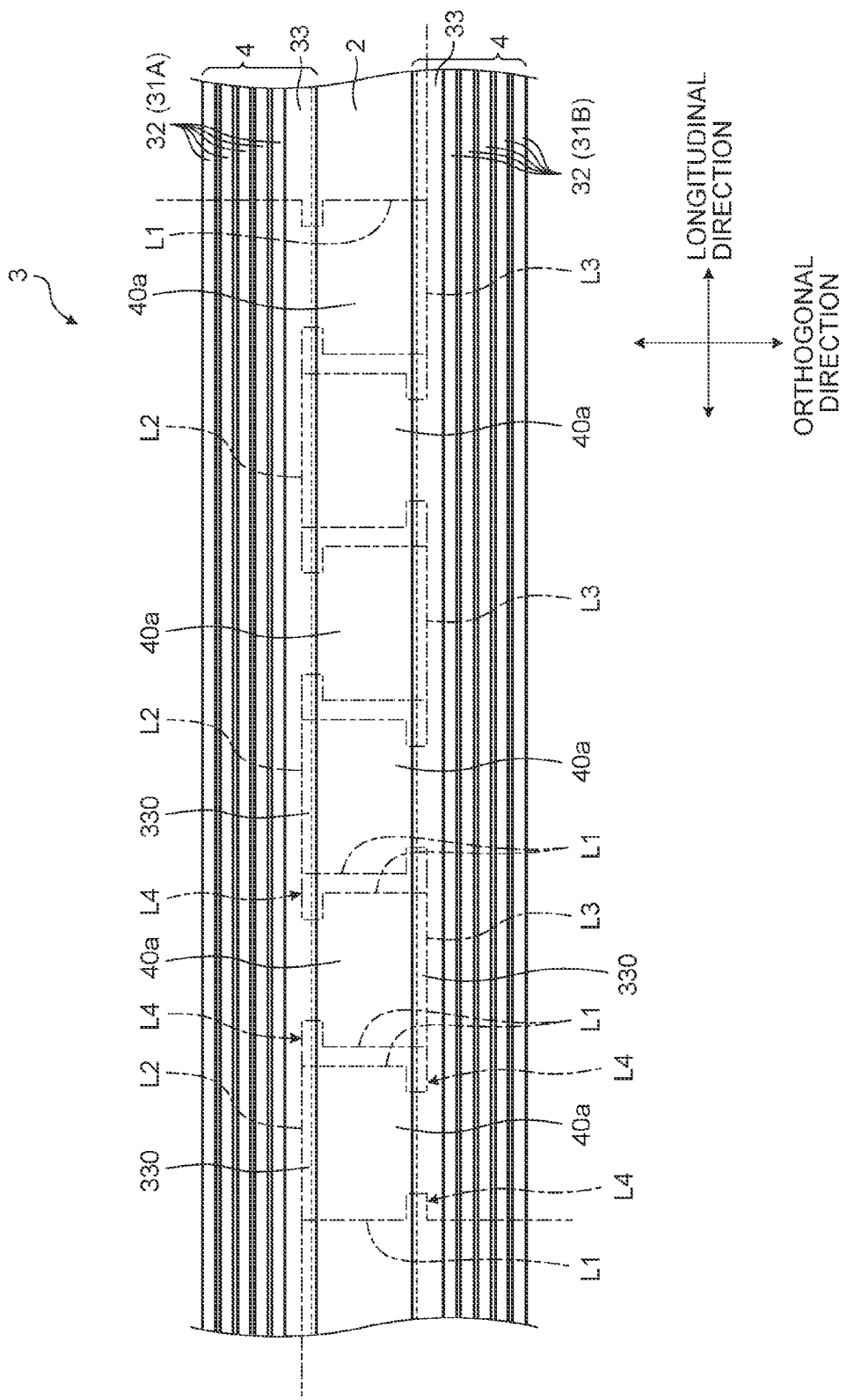
FIG. 12 is a plan view illustrating an example of cutting lines set for busbar modules according to the modification.
Figure 13:
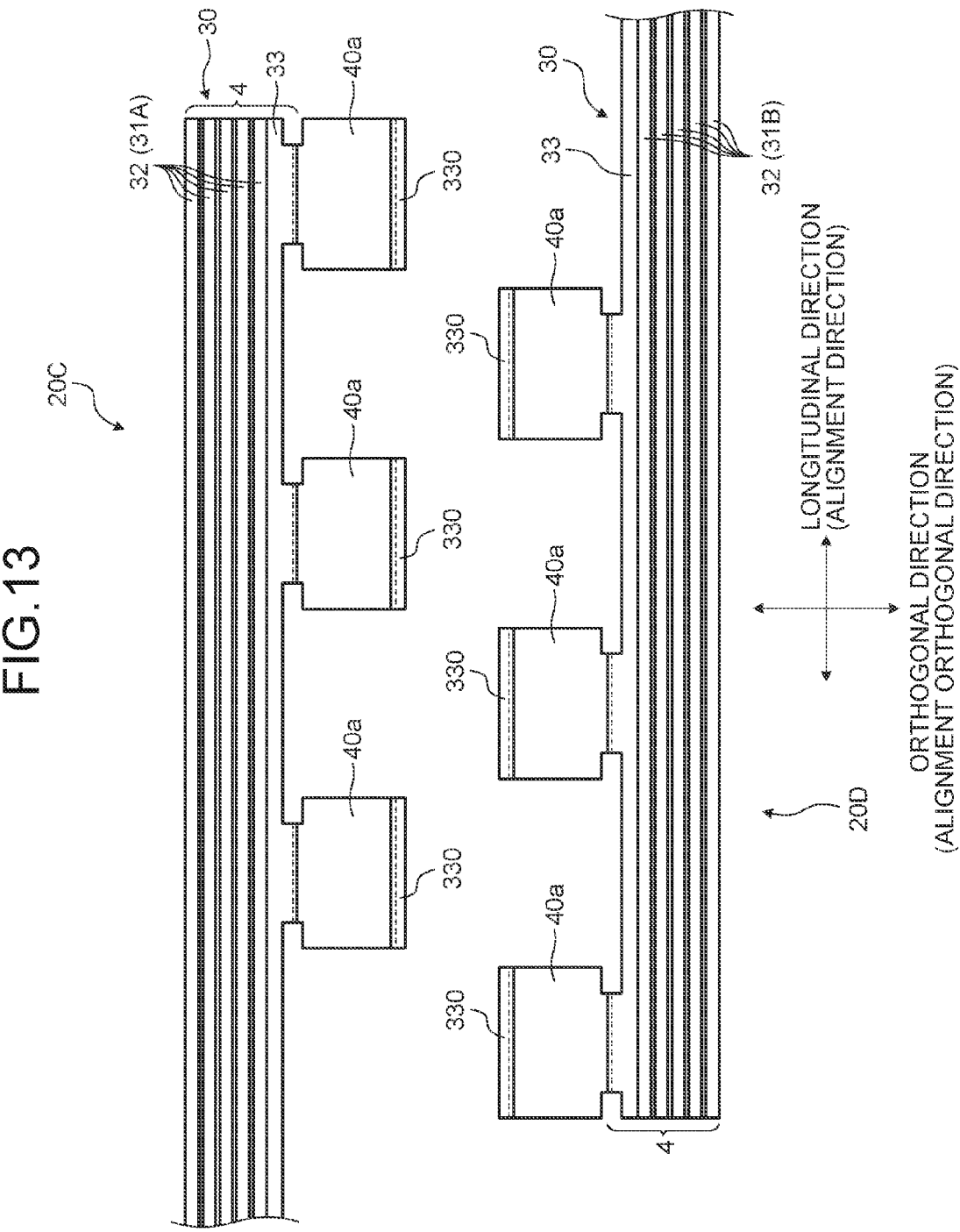
FIG. 13 is a plan view illustrating a first cutting step for the busbar modules according to the modification.

At the cutting step, as illustrated in FIGS. 12 and 13, the flat circuit body 3 is cut along the first cutting lines L1, the second cutting lines L2, and the third cutting lines L3 that have been set in advance to form the first busbar module 20C including the first linear conductors 31A and busbars 40a that are joined to the first linear conductors 31A and the second busbar module 20D including the second linear conductors 31B and busbars 40a that are joined to the second linear conductors 31B. The first cutting lines L1 are cutting lines that extend in a direction orthogonal to the longitudinal direction of the planar conductor 2 and along which the planar conductor 2 is cut to form a plurality of busbars 40a. The second cutting lines L2 are cutting lines that extend in the longitudinal direction of the planar conductor 2 and along which every other joint portion of a plurality of joint portions 330 is cut out, the joint portions 330 at which the busbars 40a are joined to the first linear conductors 31A with the insulating cover material 4. The third cutting lines L3 are cutting lines that extend in the longitudinal direction of the planar conductor 2 and along which a plurality of joint portions 330 are cut out, the joint portions 330 at which busbars 40a that are different from the busbars 40a to which the second cutting lines L2 are set are joined to the second linear conductors 31B with the insulating cover material 4. Fourth cutting lines L4 are cutting lines that are set at least on a region of each busbar 40a other than the joint portion 330 at which the busbar 40a is joined to the first linear conductors 31A or the second linear conductors 31B, and along which portions are cut out of the busbar 40a, one of the portions being cut out from one end of the busbar 40a in the alignment direction of the busbars 40a and the other portion being cut out from the other end of the busbar 40a in the alignment direction of the busbars 40a. The fourth cutting lines L4 are set at least on a region that is not held by the busbar holder 33. When the connection portions 42a of the busbars 40a are bent toward the electrode terminals 13, this configuration allows portions that are not held by the busbar holder 33 to be bent as the connection portions 42a. Thus, the connection portions 42a can appropreately be bent.

Figure 14:
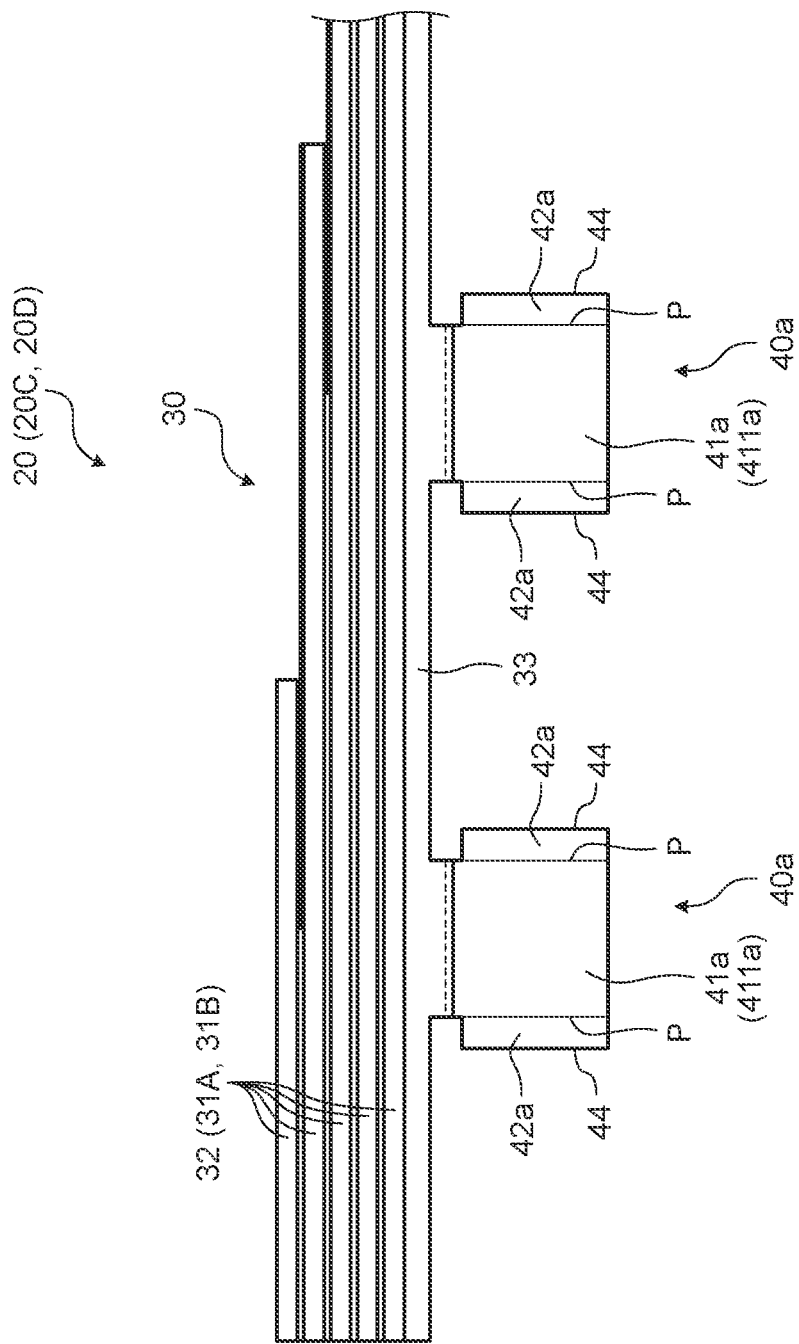
FIG. 14 is a plan view illustrating a second cutting step and a bending step for the busbar modules according to the modification.

At the bending step, as illustrated in FIG. 14, the connection portions 42a of the busbars 40a are formed. For example, the connection portions 42a of the busbar 40a each share a boundary with the base body 411a that extends in the alignment orthogonal direction of the busbars 40a and is used as the bending line P along which the busbar 40a is bent so that the ends 44 of the busbar 40a in the alignment direction come close to the electrode terminals 13.

At the connecting step, as illustrated in FIG. 15, the first linear conductors 31A are electrically connected to the corresponding busbars 40a of the first busbar module 20C, and the second linear conductors 31B are electrically connected to the corresponding busbars 40a of the second busbar module 20D.

At the joining step, in the same manner as in the joining step of the embodiment, the connection portions 42a of the busbars 40a of at least one of the first busbar module 20C and the second busbar module 20D are joined to the electrode terminals 13 of the battery module 10 composed of a plurality of battery cells 11. The connection portions 42a of the busbars 40a protrude toward the electrode terminals 13 relative to the base portion 41a located between the connection portions 42a. This configuration enables a factory worker to easily and directly join the connection portions 42a to the electrode terminals 13 without causing the base portion 41a to contact the electrode terminals 13 even when the electrode terminals 13 are at different height positions in a height direction of the battery cells 11.

By the method for manufacturing busbar modules and the method for manufacturing a battery pack according to the modification, the planar conductor 2 is cut along the first cutting lines L1, the second cutting lines L2, the third cutting lines L3, and the fourth cutting lines L4 that have been set in advance. The fourth cutting lines L4 are cutting lines that are set at least on a region of each busbar 40a other than the joint portion 330 at which the busbar 40a is joined to the first linear conductors 31A or the second linear conductors 31B, and along which portions are cut out of the busbar 40a, one of the portions being cut out from one end of the busbar 40a in the alignment direction of the busbars 40a and the other portion being cut out from the other end of the busbar 40a in the alignment direction of the busbars 40a. The connection portions 42a of the busbar 40a each have a boundary with the base body 411a that extends in the alignment orthogonal direction of the busbars 40a and is used as the bending line P along which the busbar 40a is bent so that the ends 44 of the busbar 40a in the alignment direction come close to the electrode terminals 13. The busbar modules 20C and 20D are thus formed. With this configuration, the busbar modules 20C and 20D allow the connection portions 42a to be easily and directly joined to the electrode terminals 13 without causing the base portion 41 to contact the electrode terminals 13 even when the electrode terminals 13 are at different height positions. The busbar modules 20C and 20D allow the ends 44 of the connection portions 42a to be directly joined to the electrode terminals 13. This configuration enables the factory worker to easily join the busbars to the electrode terminals and easily check the joining state. Thus, the factory worker can improve his or her work performance with the busbar modules 20C and 20D.

In the description above, the connection portions 42 and 42a of the busbars 40 and 40a are directly joined to the electrode terminals, but are not limited to this. For example, each busbar 40 may have two through holes in the alignment direction of the busbars. Electrode terminals configured of, for example, bolts may be inserted into the through holes and the electrode terminals and the busbar may be fastened by the nuts.

The method for manufacturing busbar modules and the method for manufacturing a battery pack according to the embodiment alternately form the busbars of the first busbar module and the busbars of the second busbar module in the longitudinal direction of the planar conductor. This configuration can reduce cutting waste of the planar conductor and the linear conductors in manufacturing busbar modules and a battery pack.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for manufacturing busbar modules, the method comprising steps of:
    placing a plurality of first linear conductors on one side and a plurality of second linear conductors on the other side across a long planar conductor, and extruding an insulating cover material to cover the first linear conductors and join the first linear conductors to the planar conductor with the insulating cover material, and to cover the second linear conductors and join the second linear conductors to the planar conductor with the insulating cover material;
    defining first, second, and third cutting lines;
    shaping first, second, and third cutting lines to form a plurality of busbars;
    cutting the planar conductor along the first cutting lines, the second cutting lines, and the third cutting lines,
    forming a first busbar module by joining the first linear conductors and the plurality of busbars;
    forming a second busbar module by joining the second linear conductors and the plurality of busbars; and
    obtaining the busbar modules, wherein
    the first cutting lines extend in a direction orthogonal to a longitudinal direction of the planar conductor and cutting of the planar conductor to form the busbars occurs therealong, the second cutting lines extend in the longitudinal direction of the planar conductor and along each and every one of other joint portion cutting out of a plurality of joint portions occurs, the joint portions are portions at which joining the busbars to the first linear conductors with the insulating cover material occurs, and the third cutting lines extend in the longitudinal direction of the planar conductor and cutting out of a plurality of joint portions occurs therealong, the joint portions of the busbars being those to which the second cutting lines are set to be joined to the second linear conductors with the insulating cover material.

2. The method for manufacturing busbar modules according to claim 1, wherein
    setting the first cutting lines occurs such that a distance between the busbars in an alignment direction of the busbars is longer than a distance between electrode terminals to which joining the busbars occurs.

3. The method for manufacturing busbar modules according to claim 2, wherein
    performing the cutting occurs along the first cutting lines, the second cutting lines, the third cutting lines, and fourth cutting lines that have been set in advance,
    the fourth cutting lines that are set at least on a region of each one of the plurality of busbars, the region being other than a joint portion at which joining each one of the plurality of busbars to the first linear conductors or the second linear conductors occurs, and cutting portions out of each one of the plurality of busbars occurs therealong, one of the portions being cut out from one end of each one of the plurality of busbars in an alignment direction of the plurality of busbars and another portion being cut out from another end of each one of the plurality busbars in the alignment direction of the plurality busbars.

4. The method for manufacturing busbar modules according to claim 1, wherein
    performing the cutting occurs along the first cutting lines, the second cutting lines, the third cutting lines, and fourth cutting lines that have been set in advance, and
    the fourth cutting lines are set at least on a region of each one of the plurality of busbars, the region being other than a joint portion at which each one of the plurality of busbars is joined to the first linear conductors or the second linear conductors, and cutting portions out of each one of the plurality of busbars, one of the portions being cut out from one end of each one of the plurality of busbars in an alignment direction of each one of the plurality of busbars and another portion being cut out from another end of each one of the plurality of busbars in the alignment direction of the plurality of busbars.

* * * * *